UNITED STATES PATENT OFFICE 2,623,048

4-THIAZOLIDONE DERIVATIVES AND PROCESS FOR PREPARING THE SAME

Loren M. Long, Grosse Pointe Woods, and Harvey D. Troutman, Ferndale, Mich., assignors to Parke, Davis & Company, Detroit, Mich., a corporation of Michigan No Drawing. Application April 5, 1948, Serial No. 19,174

13 Claims. (Cl. 260—301)

This invention relates to a new class of therapeutically valuable heterocyclic organic compounds and to methods for obtaining the same. More particularly, the invention relates to a class of heterocyclic organic compounds composed of certain substituted 4-thiazolidones and 4-thiazolidone-1-dioxides having the general formula,

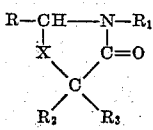

where R is a substituted or unsubstituted phenyl radical, a 2-furyl radical or a 2-thienyl radical; $R_1$ is a lower alkyl, a dialkylamino substituted alkyl, a lower alkenyl or a lower aralkyl radical; $R_2$ and $R_3$ are the same or different and represent hydrogen or lower alkyl radicals and X is —S— or —$SO_2$—. Some examples of the substituents which may be present in the phenyl ring of the products wherein R is a substituted phenyl radical are halogen, nitro, amino, lower alkyl and lower alkoxy groups.

In accordance with the invention, an α-mercapto-acetic acid or ester thereof is reacted with an azomethine compound to obtain the corresponding 4-thiazolidone compound which, if desired, can be converted to the corresponding 4-thiazolidone-1-dioxide by the oxidation methods hereinafter described. These transformations may be diagrammatically illustrated as follows:

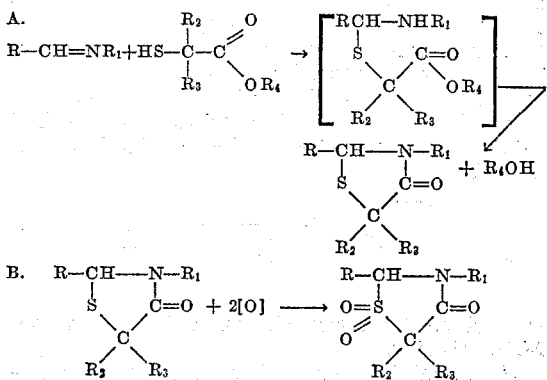

where $R_4$ is hydrogen or a lower alkyl radical and R, $R_1$, $R_2$ and $R_3$ have the same significance as given above.

The reaction between the α-mercapto acetic acid compound and the azomethine compound, represented by A in the above diagram, can be carried out either in the presence or absence of an inert organic solvent and at a temperature between about 25 and 200° C. Some examples of the solvents which can be used are benzene, toluene, xylene, ethanol, n-propanol, petroleum ether, chloroform and the like. The preferred starting materials for the reaction are the α-mercapto acetic acid ester compounds since the intermediate condensation products formed from the ester compounds cyclize much more readily and at lower temperatures than do the corresponding intermediate products derived from the free acid starting materials.

The oxidation of the 4-thiazolidone compounds to the corresponding 4-thiazolidone-1-dioxides, represented by B in the above diagram, is carried out below 100° C. under acidic conditions using hydrogen peroxide or chromic acid as the oxidizing agent. Water, anhydrous organic solvents or mixtures of the same can be used as reaction media. When hydrogen peroxide, the preferred oxidizing agent, is used it is preferable to keep the amount of water present in the reaction mixture at a minimum and, where the solvent used is not acidic per se, to add a small amount of mineral acid to the reaction mixture. Some examples of the organic solvents which can be used with this oxidizing agent are acetone, methyl ethyl ketone, diethyl ketone, ethanol, n-propanol, acetic acid, acetic anhydride and the like.

The substituted 4-thiazolidone and 4-thiazolidone-1-dioxide products of the invention are particularly useful in the treatment of petit mal epilepsy due to a combination of their unique anticonvulsant activity, low toxicity and freedom from depressive side effects. Some of these novel products also possess a relatively high degree of analgetic activity and are therefore useful in relieving pain.

The invention is illustrated by the following examples.

Example 1

(a) 74 g. of methyl thioglycolate is added slowly to 107 g. of refluxing benzylidene n-propylamine and refluxing continued (temperature about 155-60° C.) for about two and one-half hours while a stream of nitrogen is passed through the mixture. After the reaction mixture has cooled, 250 cc. of water is added and the mixture steam distilled until about two liters of distillate is collected. The residue in the still is cooled, the solid collected and distilled with 350 cc. of toluene until no more water appears in the condensate. The toluene solution is decolorized with charcoal, filtered and the toluene distilled from the filtrate in vacuo. The residue which consists of the desired 2-phenyl-3-n-propyl-4-thiazolidone of formula,

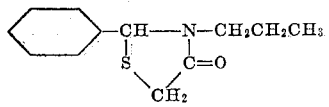

crystallizes on cooling as a pale yellow solid. Recrystallization from benzene yields the pure white crystalline product melting at 67–8° C.

By substituting an equivalent amount of benzylidene methylamine, ethylamine or n-butylamine for the benzylidene n-propylamine used in the above procedure one obtains 2-phenyl-3-methyl-4-thiazolidone (purified by distillation; B. P. 147–9° C./1.9 mm.), 2-phenyl-3-ethyl-4-thiazolidone (M. P. 54–55° C.) and 2-phenyl-3-n-butyl-4-thiazolidone (M. P. 56.5–57.5° C.), respectively.

(b) 125 cc. of 30% aqueous hydrogen peroxide is added in one portion to a mixture consisting of 60 g. of 2-phenyl-3-n-propyl-4-thiazolidone, 500 cc. of glacial acetic acid and 125 cc. of acetic anhydride. The temperature of the reaction mixture rises to about 55° C. and is maintained at this point until the exothermic reaction ceases. The reaction mixture is evaporated to dryness in vacuo below 60° C. and the residue heated under reflux with 200 cc. of methanol and 800 cc. of water. The mixture is cooled and the crude 2-phenyl-3-n-propyl-4-thiazolidone-1-dioxide collected. Recrystallization from methanol yields the desired product in the form of white crystals melting at 108–110° C. the formula of this product is:

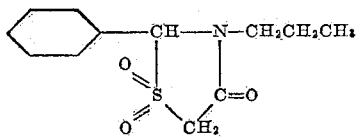

Treatment of 2-phenyl-3-methyl-4-thiazolidone, 2-phenyl-3-ethyl-4-thiazolidone or 2-phenyl-3-n-butyl-4-thiazolidone in an analogous manner yields 2-phenyl-3-methyl-4-thiazolidone-1-dioxide (M. P. 123–4° C.), 2-phenyl-3-ethyl-4-thiazolidone-1-dioxide (M. P. 99–100° C.) and 2-phenyl-3-n-butyl-4-thiazolidone-1-dioxide (M. P. 86–7° C.), respectively.

Example 2

53 g. of methyl thioglycolate is added slowly to 72.5 g. of refluxing benzylidene allylamine and refluxing continued for about two and one-half hours while a stream of nitrogen is passed through the mixture. After the reaction mixture has cooled, 200 cc. of water is added and the mixture steam distilled until about two liters of distillate is collected. The residue is cooled and the solid collected. 300 cc. of toluene is added to the solid and the toluene distilled until no more water appears in the condensate. The residual solution is decolorized with carbon and the toluene distilled in vacuo to obtain the desired 2-phenyl-3-allyl-4-thiazolidone of formula,

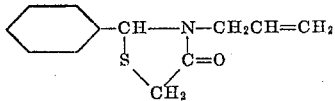

Recrystallization of the crude product from benzene yields the pure thiazolidone melting at 48–9° C.

Example 3

(a) 53 g. of methyl thioglycolate is added slowly to 98 g. of benzilidine benzylamine at about 155–60° C. and heating continued for about two and one-half hours while a stream of nitrogen is passed through the mixture. The reaction mixture is cooled, treated with 250 cc. of water and steam distilled until about two liters of distillate has been collected. The residue is cooled and the crude 2-phenyl-3-benzyl-4-thiazolidone of formula,

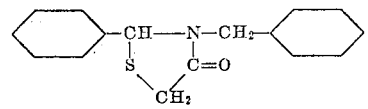

collected. The crude product is dried by adding it to 250 cc. of toluene and distilling off the toluene until no more water appears in the condensate. The dry toluene solution is decolorized with carbon, the toluene distilled in vacuo and the residual product purified by recrystallization from benzene: M. P. 153–4° C.

(b) 125 cc. of 30% aqueous hydrogen peroxide is added in one portion to a mixture consisting of 60 g. of 2-phenyl-3-benzyl-4-thiazolidone, 500 cc. of glacial acetic acid and 125 cc. of acetic anhydride and the temperature of the reaction mixture maintained at about 60° C. for one-half hour. The reaction mixture is evaporated to dryness in vacuo below 60° C. and the residue heated under reflux with one liter of 20% methanol. The mixture is cooled, the crude 2-phenyl-3-benzyl-4-thiazolidone-1-dioxide collected and purified by recrystallization from alcohol; M. P. 127–8° C. The formula of this product is:

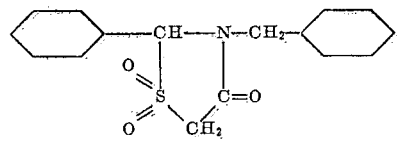

Example 4

(a) 63.5 g. of methyl thioglycolate is added slowly to 144 g. of 3-nitrobenzylidine benzylamine at 150° C. and heating continued for about three hours while passing a stream of nitrogen through the mixture. The reaction mixture is cooled, treated with 250 cc. of water and steam distilled. The residue is cooled and the crude product collected. The crude product is dissolved in 350 cc. of toluene and dried by distilling off the toluene until no more water appears in the distillate. The solution is decolorized with charcoal and the toluene distilled under reduced pressure. The crystalline residue which consists of the desired 2-(3'-nitrophenyl)-3-benzyl-4-thiazolidone of formula,

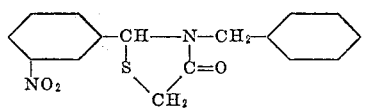

is purified by recrystallization from benzene; M. P. 113–4° C.

(b) A mixture consisting of 60 g. of 2-(3'-nitrophenyl)-3-benzyl-4-thiazolidone, 440 g. of zinc dust, 15 g. of calcium chloride, 215 cc. of water and 1300 cc. of 95% ethanol is refluxed for about twelve hours, filtered and the filtrate evaporated to a volume of one liter. Two liters of water is added and the white product which precipitates collected. This product which is 2-

(3'-aminophenyl)-3-benzyl-4-thiazolidone of formula,

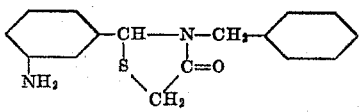

can be purified by recrystallization from ethanol; M. P. 132–3° C.

Example 5

(a) 53 g. of methyl thioglycolate is added slowly to 76.8 g. of 4-chlorobenzylidene methylamine at 155° C. and the mixture heated at this temperature for about two and a half hours while a stream of nitrogen is passed through the mixture. After the reaction mixture has cooled, 250 cc. of water is added and the mixture steam distilled until about two liters of distillate is collected. The residue in the still is cooled, the solid collected and distilled with 350 cc. of toluene until no more water appears in the condensate. The toluene solution is decolorized with carbon, the toluene evaporated under reduced pressure and the residual crude 2-(4'-chlorophenyl)-3-methyl-4-thiazolidone of formula,

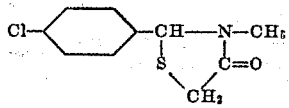

purified by distillation in high vacuo; B. P. 184–5° C./3 mm.

By employing 4-chlorobenzylidene ethylamine or n-propylamine in the above procedure instead of 4-chlorobenzylidene methylamine one obtains 2-(4'-chlorophenyl)-3-ethyl-4-thiazolidone (M. P. 69–70° C.) and 2-(4'-chlorophenyl)-3-n-propyl-4-thiazolidone (M. P. 64–5° C.) respectively. These products which are solids can either be purified by distillation in vacuo as described above or by recrystallization from an organic solvent such as bezene.

(b) 125 cc. of 30% aqueous hydrogen peroxide is added to a mixture consisting of 60 g. of 2-(4'-chlorophenyl)-3-methyl-4-thiazolidone, 500 cc. of glacial acetic acid and 125 cc. of acetic anhydride. The temperature of the reaction mixture rises to about 60° C. and is maintained at this point until the exothermic reaction ceases. The reaction mixture is evaporated to dryness in vacuo below 60° C. and the residue refluxed with about one liter of 20% methanol. The mixture is cooled and the crude 2-(4'-cholorphenyl)-3-methyl-4-thiazolidone-1-dioxide collected purified by recrystallization from methanol; M. P. 155–6° C.

By substituting 2-(4'-chlorophenyl-3-ethyl-4-thiazolidone for the 3-methyl derivative used in the above procedure one obtains 2-(4'-chlorophenyl)-3-ethyl-4-thiazolidone-1-dioxide; M. P. 145–6° C.

Example 6

53 g. of methyl thioglycolate is added slowly to 94 g. of 3,4-dichlorobenzylidene methylamine and the mixture heated at about 160° C. for two hours while a stream of nitrogen is passed through the liquid. The reaction mixture is cooled, treated with about 250 cc. of water and steam distilled until about two liters of distillate is collected. The residue is cooled and the 2-(3',4'-dichlorophenyl)-3-methyl-4-thiazolidone of formula,

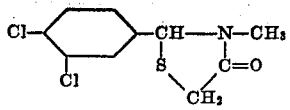

taken up in toluene and the layer separated from the aqueous solution. The toluene is distilled to obtain the desired thiazolidone as a light colored non-distillable oil.

Example 7

(a) A mixture consisting of 53 g. of methyl thioglycolate and 54 g. of furfurylidene methylamine is heated under reflux for about two to three hours while a stream of nitrogen is bubbled through the solution. The reaction mixture is cooled, treated with 250 cc. of water and steam distilled until about two liters of distillate has been collected. The residue is cooled and the solid collected. The solid product is treated with about 350 cc. of benzene and the benzene distilled until no more water appears in the distillate. The residual solution is decolorized with carbon, the benzene evaporated from the filtrate in vacuo and the residue distilled under high vacuo to obtain the desired 2-(2'-furyl)-3-methyl-4-thiazolidone; B. P. 134–40° C./3 mm. On standing the product crystallizes to a white solid melting at 78° C. after recrystallization from benzene-ethyl acetate mixture. Its formula is:

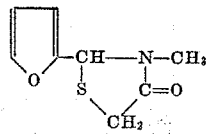

(b) 125 cc. of 30% hydrogen peroxide is added to a mixture consisting of 60 g. of 2-(2'-furyl)-3-methyl-4-thiazolidone, 500 cc. of glacial acetic acid and 125 cc. of acetic anhydride. The temperature of the reaction mixture is maintained at about 60° C. for one-half hour and then evaporated to dryness in vacuo below 60° C. The residue is heated under reflux with about one liter of 20% methanol, the mixture cooled and the crude 2-(2'-furyl)-3-methyl-4-thiazolidone-1-dioxide collected and purified by recrystallization from methanol. The formula of this product is:

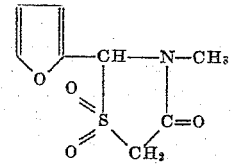

Example 8

(a) 0.5 g. of anhydrous calcium chloride is added to a mixture consisting of 63.6 g. of methyl thioglycolate and 75 g. of 2-thienylidene methylamine and the resulting mixture heated under reflux for about two and one-half hours while passing a stream of nitrogen through the liquid. The mixture is cooled, treated with about 250 cc. of water and steam distilled until two liters of distillate is collected. The residue is cooled and the solid product collected. The solid is dissolved in 200 cc. of benzene and the benzene distilled until water no longer appears in the distillate. The remaining benzene is distilled in vacuo and the brownish-yellow solid which forms on cooling the residue taken up in and recrystallized from benzene-ethyl acetate mixture. The recrystallized white solid which melts at 65-6° C. is 2-(2'-thienyl)-3-methyl-4-thiazolidone of formula,

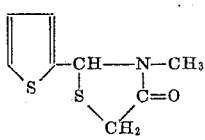

(b) 125 cc. of 30% aqueous hydrogen peroxide is added to a mixture consisting of 60 g. of 2-(2'-thienyl)-3-methyl-4-thiazolidone, 500 cc. of glacial acetic acid and 125 cc. of acetic anhydride and the temperature of the resulting mixture maintained at about 60° for about one-half hour. The reaction mixture is evaporated to dryness below 60° C. in vacuo and the residue boiled with about one liter of 20% methanol. The methanol mixture is cooled and the crude 2-(2'-thienyl)-3-methyl-4-thiazolidone-1-dioxide collected and purified by recrystallization from methanol. The formula of this product is:

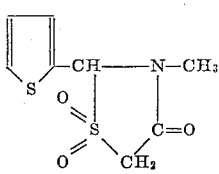

*Example 9*

(a) 53 g. of methyl thioglycolate is added slowly to 101 g. of benzylidene β-diethylaminoethylamine and the mixture allowed to warm spontaneously to about 75° C. The mixture is allowed to stand at room temperature for twenty-four hours, treated with about 200 cc. of water and steam distilled until about two liters of distillate has been collected. The residue is cooled, extracted with ether and the ether distilled from the combined extracts after drying. The residue is distilled under high vacuo to obtain the desired 2-phenyl-3-β-diethylaminoethyl-4-thiazolidone as a light yellow oil; B. P. 165-8° C./2 mm. The formula of this product is:

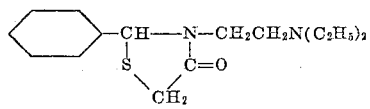

(b) 125 cc. of 30% aqueous hydrogen peroxide is added to a mixture consisting of 60 g. of 2-phenyl-3-β-diethylaminoethyl-4-thiazolidone, 500 cc. of glacial acetic acid and 125 cc. of acetic anhydride and the resulting mixture heated at about 60° C. for one-half hour. The reaction mixture is evaporated to dryness in vacuo at a low temperature and the residue treated with about 400 cc. of water. Dilute sodium hydroxide solution is added to the solution and the desired 2-phenyl-3-β-diethylaminoethyl-4-thiazolidone-1-dioxide of formula,

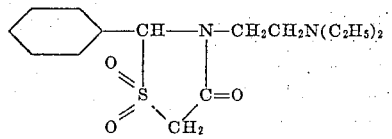

which separates collected.

*Example 10*

(a) 67 g. of ethyl α-mercaptopropionate is added slowly to 74 g. of 2-methyl benzylidene ethylamine and the mixture heated at about 100° C. for three hours while a stream of nitrogen is passed through the liquid. The reaction mixture is cooled, treated with about 200 cc. of water and steam distilled. The residue is cooled and the solid product collected. The solid is dissolved in about 300 cc. of toluene and the toluene solution dried by distillation. The remaining toluene is distilled in vacuo and the residual 2-(2'-methylphenyl)-3-ethyl-5-methyl-4-thiazolidone purified by recrystallization from benzene ethyl acetate mixture. The formula of this product is:

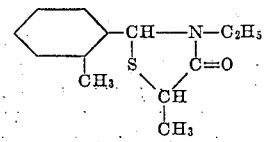

(b) 60 g. of 2-(2'-methylphenyl)-3-ethyl-5-methyl-4-thiazolidone is dissolved in a mixture consisting of 500 cc. of glacial acetic acid and 125 cc. of acetic anhydride and the resulting solution treated with 125 cc. of 30% aqueous hydrogen peroxide. The reaction mixture is heated at about 60° C. for one hour and then evaporated to dryness in vacuo at a temperature below about 60° C. The residue is boiled with dilute methanol, the mixture cooled and the desired 2-(2'-methylphenyl) - 3 - ethyl-5-methyl-4-thiazolidone-1-dioxide of formula,

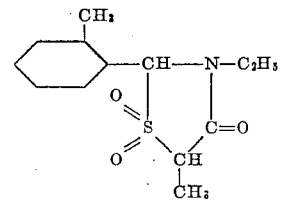

collected.

*Example 11*

(a) 74 g. of ethyl α-mercapto isobutyrate is added slowly to 81 g. of 4-methoxy benzyldene ethylamine and the mixture heated at 125° C. for about two hours while a stream of nitrogen is passed through the solution. The reaction mixture is cooled, treated with about 250 cc. of water and steam distilled until about two liters of distillate has been collected. The residue is cooled and the crude 2-(4'-methoxyphenyl)-3-ethyl - 5,5 - dimethyl-4-thiazolidone collected. The crude product is dried by distillation with toluene and purified, after evaporation of the toluene, by recrystallization from benzene. The formula of this product is:

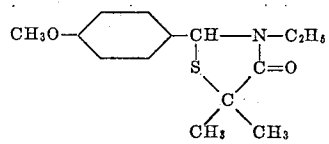

By oxidizing 2-(4'-methoxyphenyl)-3-ethyl-5,5-dimethyl-4-thiazolidone with hydrogen peroxide under the conditions described in the preceding example one obtains 2-(4'-methoxyphenyl) - 3 - ethyl-5,5-dimethyl-4-thiazolidone-1-dioxide.

Some further examples of the product which can be obtained by the methods described above are:

1. 2 - (3',4' - dimethylphenyl) - 3-methyl-5-ethyl-4-thiazolidone.
2. 2 - (3',4' - dimethylphenyl) - 3-methyl-5-ethyl-4-thiazolidone-1-dioxide.

3. 2-(2'-thienyl)-3-benzyl-4-thiazolidone.
4. 2-(2'-thienyl)-3-benzyl-4-thiazolidone - 1 - dioxide.
5. 2-(2'-thienyl)-3-allyl-5-methyl-4-thiazolidone.
6. 2-(4' - methylphenyl)-3-γ-dimethylaminopropyl-4-thiazolidone.
7. 2-(4' - methylphenyl)-3-γ-dimethylaminopropyl-4-thiazolidone-1-dioxide.
8. 2 - (2' - furyl)-3-phenylethyl-5-methyl-4-thiazolidone.
9. 2 - (2' - furyl)-3-phenylethyl-5-methyl-4-thiazolidone-1-dioxide.
10. 2 - (2' - furyl)-3-β-dimethylaminoethyl-5,5-dimethyl-4-thiazolidone.
11. 2 - (2' - furyl)-3-β-dimethylaminoethyl-5,5-dimethyl-4-thiazolidone-1-dioxide.
12. 2 - (4' - chlorophenyl)-3-ethyl-5-methyl-4-thiazolidone.
13. 2 - (4' - chlorophenyl)-3-ethyl-5-methyl-4-thiazolidone-1-dioxide.
14. 2 - (4' - chlorophenyl)-3-benzyl-5-n-propyl-4-thiazolidone.
15. 2 - (4' - chlorophenyl)-3-benzyl-5-n-propyl-4-thiazolidone-1-dioxide.
16. 2 - (3',4' - dimethoxyphenyl)-3-methyl-4-thiazolidone.
17. 2 - (3',4' - dimethoxyphenyl)-3-methyl-4-thiazolidone-1-dioxide.

What we claim is:
1. A compound of the formula,

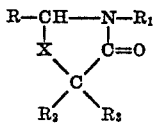

where R is a member of the class consisting of monocarbocyclic aryl, 2-furyl and 2-thienyl radicals, $R_1$ is a member of the class consisting of lower alkyl, lower dialkylamino substituted lower alkyl, lower alkenyl and lower aralkyl radicals, $R_2$ and $R_3$ are members of the class consisting of hydrogen and lower alkyl radicals and X is a member of the class consisting of —S— and —$SO_2$—.

2. A compound of the formula,

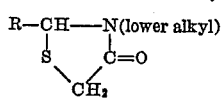

where R is a monocarbocyclic aryl group.

3. A compound of the formula,

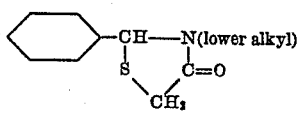

4. A compound of the formula,

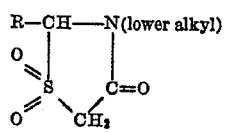

where R is a monocarbocyclic aryl group.

5. A compound of the formula,

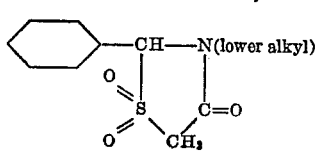

6. A compound of the formula,

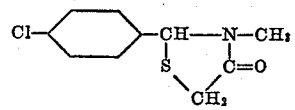

7. A compound of the formula,

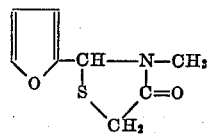

8. A compound of the formula,

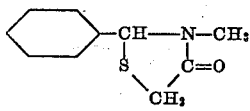

9. 2-phenyl-3-ethyl-4-thiazolidone.
10. 2-phenyl-3-ethyl-4-thiazolidone - 1 - dioxide.
11. Process for obtaining a compound of formula,

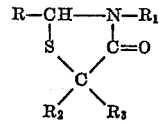

which comprises reacting a compound of formula,

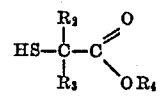

with an azomethine compound of formula,

R—CH=N—$R_1$ where R is a member of the class consisting of monocarbocyclic aryl, 2-furyl and 2-thienyl radicals, $R_1$ is a member of the class consisting of lower alkyl, lower dialkylamino substituted lower alkyl, lower alkenyl and lower aralkyl radicals and $R_2$, $R_3$ and $R_4$ are members of the class consisting of hydrogen and lower alkyl radicals.

12. Process which comprises reacting a compound of formula,

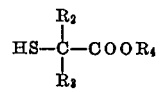

with an azomethine compound of formula,

R—CH=N—$R_1$ to obtain a 4-thiazolidone compound of formula,

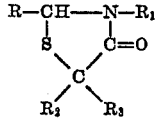

and thereafter oxidizing said 4-thiazolidone compound to the corresponding 4-thiazolidone-1-dioxide of formula,

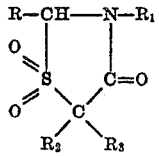

where R is a member of the class consisting of monocarbocyclic aryl, 2-furyl and 2-thienyl radicals, $R_1$ is a member of the class consisting of lower alkyl, lower dialkylamino-substituted lower alkyl, lower alkenyl and lower aralkyl radicals and $R_2$, $R_3$ and $R_4$ are members of the class consisting of hydrogen and lower alkyl radicals.

13. Process for obtaining a 4-thiazolidone-1-dioxide compound of formula,

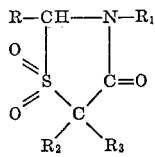

which comprises oxidizing a 4-thiazolidone compound of formula,

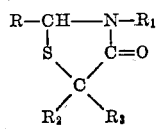

under acidic conditions with an oxidizing agent of the class consisting of hydrogen peroxide and chromic acid, where R is a member of the class consisting of monocarbocyclic aryl, 2-furyl and 2-thienyl radicals, $R_1$ is a member of the class consisting of lower alkyl, lower dialkylamino substituted lower alkyl, lower alkenyl and lower aralkyl radicals and $R_2$ and $R_3$ are members of the class consisting of hydrogen and lower alkyl radicals.

LOREN M. LONG.
HARVEY D. TROUTMAN.

No references cited.